United States Patent
Wei et al.

(10) Patent No.: US 7,799,269 B2
(45) Date of Patent: Sep. 21, 2010

(54) METHOD OF SINTERING AlN UNDER A METHANE-CONTAINING NITROGEN ATMOSPHERE

(75) Inventors: George C. Wei, Weston, MA (US); Harry S. Mackel, Pepperell, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/860,559

(22) Filed: Sep. 25, 2007

(65) Prior Publication Data

US 2009/0079112 A1    Mar. 26, 2009

(51) Int. Cl.
  *C04B 35/581*  (2006.01)
  *C04B 35/58*  (2006.01)
  *C04B 35/64*  (2006.01)
(52) U.S. Cl. ........................ 264/676; 264/674
(58) Field of Classification Search ............... 264/603, 264/646–648, 653, 659, 662–664, 674, 676; 428/34.4–34.5
  See application file for complete search history.

(56) References Cited

U.S. PATENT DOCUMENTS

| | | | |
|---|---|---|---|
| 3,026,210 A | 3/1962 | Coble | |
| 4,435,513 A | 3/1984 | Komeya et al. | |
| 4,478,785 A | 10/1984 | Huseby et al. | |
| 4,618,592 A | 10/1986 | Kuramoto et al. | |
| 4,642,298 A | 2/1987 | Kuramoto et al. | |
| 4,950,435 A | 8/1990 | Taniguchi et al. | |
| 5,063,183 A | 11/1991 | Taniguchi et al. | |
| 5,075,587 A | 12/1991 | Pabst et al. | |
| 5,147,832 A * | 9/1992 | Shimoda et al. | 501/98.4 |
| 5,182,239 A | 1/1993 | Hirokawa et al. | |
| 5,242,872 A | 9/1993 | Taniguchi et al. | |
| 5,936,351 A | 8/1999 | Lang | |
| 6,475,924 B2 | 11/2002 | Yamamoto et al. | |
| 2005/0070421 A1* | 3/2005 | Kanechika et al. | 501/98.4 |
| 2005/0215415 A1* | 9/2005 | Hattori | 501/98.4 |
| 2005/0258759 A1* | 11/2005 | Wei | 313/634 |

FOREIGN PATENT DOCUMENTS

| | | | |
|---|---|---|---|
| EP | 0 371 315 A2 | | 6/1990 |
| EP | 0 587 238 A1 | | 3/1994 |
| JP | 04149009 | * | 5/1992 |
| WO | WO 03/060952 A1 | | 7/2003 |

OTHER PUBLICATIONS

G. Wei et al., "Outgassing behavior of carbon-bonded carbon-fiber thermal insulation," Proc. Conf. Carbon (1979) 249-250.

(Continued)

*Primary Examiner*—Jason L Lazorcik
*Assistant Examiner*—Jodi Cohen
(74) *Attorney, Agent, or Firm*—Robert F. Clark

(57) ABSTRACT

The present method uses a methane-containing nitrogen gas sintering atmosphere to sinter aluminum nitride (AlN) to a high transmittance. The methane gas replaces the solid carbon charge material used in prior art sintering methods as the source of gaseous carbon. The amount of carbon in the methane-containing nitrogen gas is easily controlled by varying the partial pressure of methane in the nitrogen gas. In addition, the methane flow is stopped prior to the end of the sintering cycle to prevent darkening of the sintered part.

16 Claims, 1 Drawing Sheet

OTHER PUBLICATIONS

L. Overholser et al., "The degassing behavior of commercial graphite," Proc. Conf. Carbon (1961) 194-204.

H. Willems et al., "Thermodynamics of Alon I: Stability at Lower Temperatures," Journal of the European Ceramic Society 10 (1992) 327-337.

J. J. de Groot and J. A. J. M. van Vliet, The High-Pressure Sodium Lamp, pp. 227-257, 290-291, MacMillan, London (1986).

S. Carleton, P. Seinen, and J. Stoffels, "Metal halide lamps with ceramic envelopes: a breakthrough in color control," J. Illum. Eng. Soc. 26 [1] 139-145 (1997).

K. Maekawa, "Recent Progress in Ceramic Materials for Lamp Application," Proc. of 7th International Symposium on the Science & Technology of Light Sources, Illuminating Engineering Institute of Japan (1995) 293-302.

S. Prochazka and C.F. Bobik, "Sintering of AIN," GE Report 79CRD167 (1979).

K. Komeya et al., "Effect of various additives on sintering of aluminum nitride," Yogyo-Kyokai-Shi 89 [6] (1981) 58-64.

N. Kuramoto and H. Taniguchi, "Transparent AIN ceramics," J. Mater. Sci. Letters 3 (1984) 471-74.

N. Kuramoto, H. Taniguchi, and I. Aso, "Development of translucent AIN ceramics," Cer. Bull. 68 [4] (1989) 883-887.

* cited by examiner

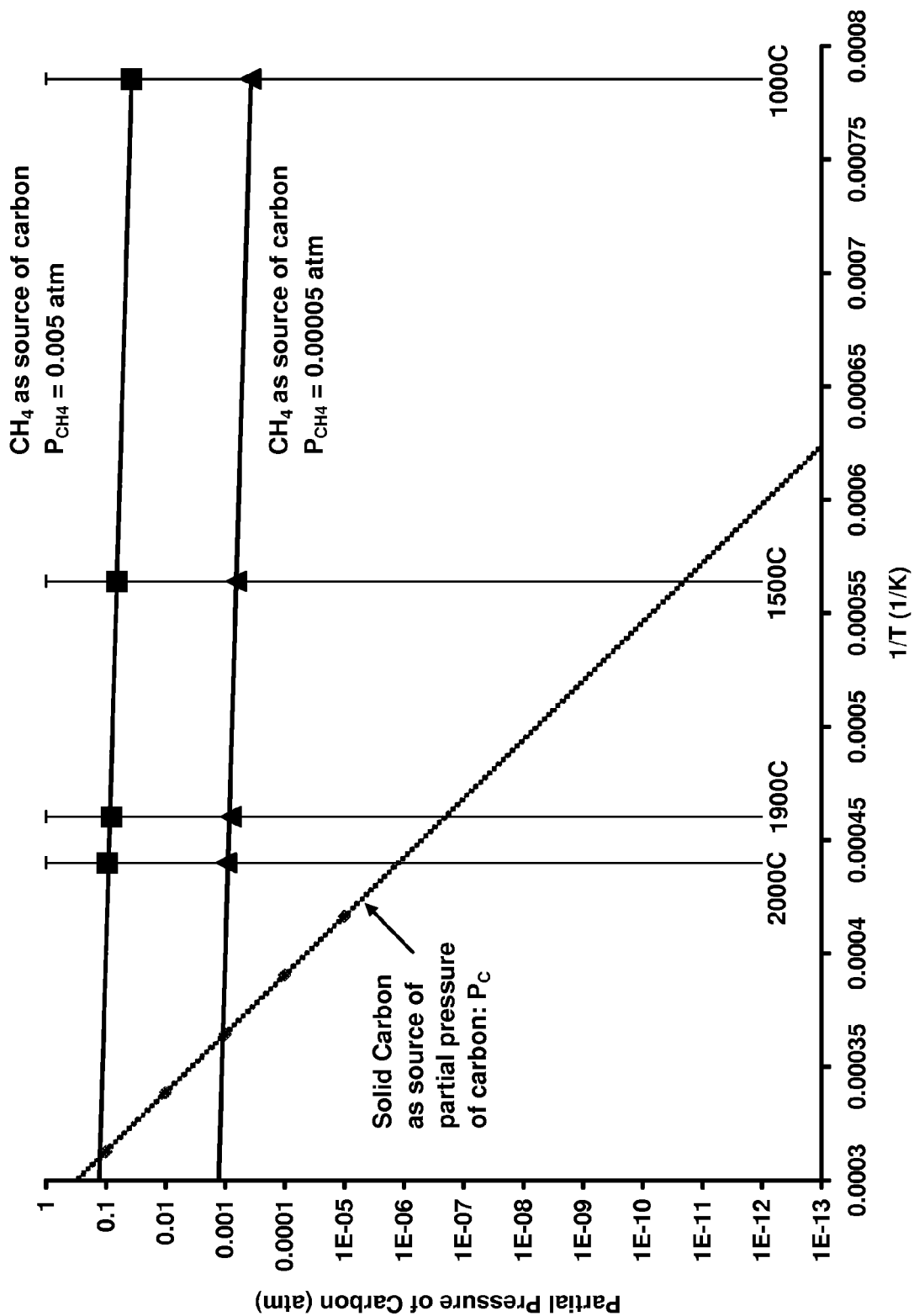

METHOD OF SINTERING AlN UNDER A METHANE-CONTAINING NITROGEN ATMOSPHERE

BACKGROUND OF THE INVENTION

Translucent polycrystalline alumina (PCA) ceramic has made possible present-day high-pressure sodium and ceramic metal halide lamps. PCA when used in ceramic metal halide lamps in place of quartz arc tubes allows for a higher wall temperature of up to 1000-1150° C. which improves the color properties and efficacy of the metal halide lamps. However, because of the reactions of alumina with the rare earth halide fills, the durability and life of such lamps is adversely impacted. Furthermore, the consumption of the lamp fills by the arc tube material can result in a wide distribution of color temperature, color rendering index (CRI), lumen output, ignition voltage rise, etc., within a large number of the same type of lamps.

Ceramic discharge vessels (also generally referred to as arc tubes) for metal halide lamps have shapes that range from cylindrical to substantially spherical. The hemispherical ends of the spherical shape yield a more uniform temperature distribution, resulting in reduced corrosion of the PCA by lamp the fills. Even so, the life of these lamps is less than typical high-pressure sodium lamps. Thus, it would be desirable to find an alternative ceramic material that would provide the benefits of PCA while being less reactive to the metal halide fills.

Aluminum nitride (AlN) has been indicated by several sources as a potential alternative material for the discharge vessel of ceramic metal halide lamps. See, e.g., K. Maekawa, "Recent Progress in Ceramic Materials for Lamp Application," *Proc. of 7$^{th}$ Light Source Conf.*, 293-302 (1995). Aluminum nitride has very good corrosion resistance and excellent thermal shock properties that would be very useful in high-power lamps. Unfortunately, it has been difficult to produce AlN discharge vessels having the high transmittance required for lighting applications.

U.S. Patent Publication No. 2005/0258759 discloses one successful method that has been used to produce high-transmittance AlN by employing a prolonged post-sintering anneal. Another method described in U.S. Patent Publication No. 2005/0070421 sinters high-transmittance AlN tubes by adding a piece of solid carbon into the sintering boats to produce a very low partial pressure of carbon in the nitrogen sintering atmosphere. However, the very low partial pressure of carbon in the sintering atmosphere is difficult to control with a solid piece of carbon. The carbon piece must be precisely weighed and a semi-static environment created around the AlN part being sintered. Moreover, the vaporization of carbon from the solid piece can lead to inhomogeneous levels of carbon vapor around the AlN part being sintered, e.g., a high dose of carbon vapor may arise in those areas having a direct line of sight to the solid carbon piece and a low dose of carbon vapor may occur in areas which are out of the line of the sight.

SUMMARY OF THE INVENTION

It is an object of the present invention to obviate the disadvantages of the prior art.

The present method uses a methane-containing nitrogen gas sintering atmosphere to sinter AlN to a high transmittance. The methane gas replaces the solid carbon charge material as the source of carbon. The amount of carbon in the methane-containing nitrogen gas is easily controlled by varying the partial pressure of methane in the nitrogen gas. Thus, the need for precision weighing of the solid piece of carbon is eliminated, as well as the need to create a semi-static environment inside the crucible to achieve the desired partial pressure of carbon.

The methane gas provides a uniform source of gaseous carbon to the AlN discharge vessel during sintering. In addition, it is possible to turn off the methane during different sintering stages thereby offering a level of control not attainable when using a solid carbon piece. The nitrogen-methane mixture may be purchased premixed in a gas cylinder, or separate nitrogen and methane gas streams may be combined prior to entry into the furnace or introduced as separate feed lines into the furnace. In a preferred method, the nitrogen sintering atmosphere contains from about 0.05% to about 1% methane by volume.

Preferably, the sintering temperature is in the range of about 1800° C. to about 1950° C., and, more preferably, from about 1900° C. to about 1925° C. The temperature ramp to the sintering temperature has a rate that is preferably less than about 10° C./minute, and, more preferably from about 2° C./minute to about 5° C./minute. The total dwell time at the sintering temperature preferably ranges from about 30 minutes to about 40 hours and, more preferably, from about 10 to about 25 hours.

It was also determined that the methane should be stopped before the sintering cycle is finished. In the latter portion of the dwell at the sintering temperature, the sintering atmosphere is changed to nitrogen gas only in order to prevent darkening of the AlN parts. In particular, the second stage of the dwell wherein only nitrogen gas is used comprises, preferably, about 25% to about 95% of the total dwell time, and, more preferably, about 25% to about 50% of the total dwell time.

Thus, in accordance with one aspect of the invention, there is provided a method of sintering an aluminum nitride article comprising the steps of:

(a) placing the aluminum nitride article in a sintering atmosphere, the sintering atmosphere comprising nitrogen gas containing from about 0.05% to about 1% methane by volume;

(b) subjecting the aluminum nitride article to an increasing temperature;

(c) holding the aluminum nitride article at a sintering temperature for a first dwell period;

(d) changing the sintering atmosphere to nitrogen gas;

(e) continue holding the aluminum nitride article at the sintering temperature for a second dwell period to form a sintered aluminum nitride article, wherein the second dwell period is from about 25% to about 95% of the sum of the first and second dwell periods; and (f) cooling the sintered aluminum nitride article.

BRIEF DESCRIPTION OF THE DRAWINGS

The FIGURE is a graph of the partial pressures of carbon from different sources.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

The partial pressures of gaseous species such as C, CO, $CO_2$, $H_2$, $CH_4$, $C_2H_2$, can be estimated from (A) the thermodynamic equilibrium between carbon and oxygen impurities in the nitrogen gas, (B) the outgassing behavior of carbonaceous materials, and (C) the decomposition of $CH_4$.

A. Equilibrium Between Solid Carbon and Carbon Vapor

The equilibrium partial pressure of carbon ($P_C$) over graphite is given in Table 1 and shown in the FIGURE.

TABLE 1

| Partial pressure of carbon ($P_C$) in torr | T, °C. |
|---|---|
| 1 | 3214 |
| 0.1 | 2926 |
| 0.01 | 2681 |
| 0.001 | 2471 |
| 0.0001 | 2288 |
| 0.00001 | 2129 |

The equilibrium partial pressure of carbon in the nitrogen sintering atmosphere at between 2000° C.-1700° C., which encompasses the range of AlN sintering temperatures, is determined as follows:

The reaction between solid carbon and gaseous oxygen to form carbon monoxide can be represented as follows:

$$2C + O_2 \rightarrow 2CO \quad (1)$$

From reaction (1), the following relationship is derived:

$$P_{CO}^2 / (P_C^2 P_{O2}) = \mathrm{Exp}(-\Delta G_0 / RT) \quad (2)$$

The free energy change ($\Delta G_0$) for reaction (1) is −600 KJ/mole and −630 KJ/mole at 2000K and 2273K, respectively. Inputting into Equation (2) the $\Delta G_0$ values at 2000K and 2273K, the value for R of 8.3 J/mole, the $P_C$ values of Table 1, and using a $PO_2$ of 1 ppm for ultra-high purity nitrogen yields a $P_{CO}$ of $4 \times 10^{-8}$ atm at 1727° C., and $1.4 \times 10^{-4}$ atm at 2000° C.

The oxidation of CO to $CO_2$ is shown in reaction (3):

$$CO + \frac{1}{2}O_2 \rightarrow CO_2 \quad (3)$$

The ratio of $P_{CO}/P_{CO2}$ for reaction (3) is represented in equation (4):

$$P_{CO}/P_{CO2} = P_{O2}^{-0.5} \quad (4)$$

Since $P_{O2}$ is 1 ppm or $1.0 \times 10^{-6}$ atm, $P_{CO}/P_{CO2}$ equals $1 \times 10^3$. Thus, $P_{CO2}$ is $4 \times 10^{-11}$ atm at 1727° C., and $1.4 \times 10^{-7}$ atm at 2000° C.

As seen in FIG. 1, the partial pressure values of carbon ($P_c$) derived from the equilibrium between gaseous and solid carbon range from about $10^{-9}$ to about $10^{-12}$ atm between 2000° C.-1700° C. This very low $P_c$ level is hard to control because (1) the levels of $P_{CO}$, $P_{CO2}$, and $P_C$ are lower than those calculated (see below) due to high-temperature outgassing of graphite furnace components, and (2) the outgassed species seep through the tiny openings between the sintering crucible and cover (which are loosely engaged) to enter into the inside of the crucible so as to dominate the $P_{CO}$, $P_{CO2}$, and $P_C$ calculated solely from the solid carbon.

B. Outgassing from Carbon Elements and Insulation

Studies have been conducted on the outgassing behavior of graphite and carbon-fiber insulation. See, e.g., G. Wei et al., "Outgassing behavior of carbon-bonded carbon-fiber thermal insulation," *Proc. Conf. Carbon*, 249-250 (1979); and L. Overholser et al., "The degassing behavior of commercial graphite," *Proc. Conf. Carbon*, 194-204 (1961). These carbon- or graphite-based furnace materials absorb gases like water vapor and oxygen, which then react with the carbon/graphite to result in the outgassing. In particular, the levels of CO, $CO_2$, and $H_2$ that can be derived from high-temperature outgassing of graphite/carbon boats, elements, and fibrous insulations will affect the sintering atmosphere since the outgassed species are always in the background of the carbon-element furnaces.

Graphite boats, carbon heating elements, and carbon-fibrous insulation in the furnace exhibit a weight loss of about 0.01-0.1% at high temperatures (>1800° C.). The major outgas species from graphite are CO and $H_2$ with ~38 cc per 100 cc of graphite. As an example, a volume of graphite boat and carbon element in the hot face of the furnace hot zone of ~100 cc releases 38 cc of gases which occupy a volume of ~3000 cc and under a relatively low gas flow speed (~1 m/min). This corresponds to a total pressure of ~$10^{-2}$ atm with about equal amounts of CO ($5 \times 10^{-3}$ atm) and $H_2$ ($5 \times 10^{-3}$ atm).

Outgassing species from carbon fibrous insulation are chiefly CO and $CO_2$. The reported 0.01-0.1% in weight loss will, for about 10 g carbon fibrous insulation in the hot face, yield ~$5 \times 10^{-5}$ mole of CO, which is ~10 cc of gas ($3 \times 10^{-3}$ atm in 3000 cc of volume) at ~2000K. Thus, for example in our furnace, consideration of outgassing of the carbon/graphite components indicates a $P_{CO}$ of ~$10^3$ atm and a $P_{H2}$ of ~$10^{-3}$ atm at ~2000° C. These values are much higher than the expected equilibrium partial pressure of carbon vapor ($P_c$) from a solid carbon source.

$H_2$ reacts with carbon to form $CH_4$ and $C_2H_2$ at high temperatures. When $P_{H2} = \sim 10^{-3}$ atm, the equilibrium partial pressures of $CH_4$ and $C_2H_2$ at 2000° C., are $2 \times 10^{10}$ and $4 \times 10^{-7}$ atm, respectively.

C. Decomposition of $CH_4$ in a Nitrogen-Methane Sintering Atmosphere

The FIGURE also shows the curves representing the calculated equilibrium partial pressures of carbon for the following reaction at two methane concentrations in nitrogen: $N_2$ containing 0.5% $CH_4$, and 0.005% $CH_4$.

$$CH_4 \rightarrow C + 2H_2 \quad (5)$$

As can be seen, the values of the equilibrium partial pressure of carbon are much higher than those derived from solid carbon, and relatively constant with respect to temperature. These are distinct advantages over the use of solid carbon whose values of partial pressure of gaseous carbon are much lower and are a strong function of temperature.

The equilibrium partial pressure of hydrogen, $P_{H2}$, is two times that of $P_C$ in accordance with Reaction 5. In the case of $N_2$ containing 0.5% $CH_4$, the calculated $P_{H2}$ are much higher than those estimated from outgassing of the carbon insulation, but are closer to each other for the case of $N_2$ containing 0.005% $CH_4$. This means that at 0.5% $CH_4$ the contribution from the background outgassing of the carbon/graphite furnace components represents a negligible contribution. However, at 0.005% $CH_4$, it becomes necessary to include the contribution from the background outgassing.

Sintering AlN Tubes Under $N_2$—$CH_4$ Atmosphere to High Transmittance

Discharge vessel shapes of equivalent to a 70 W PCA size were formed from an organic binder and an AlN powder doped with 1-3 wt % of a CaO-based sintering aid. Other sintering aids such as $Y_2O_3$ and rare earth oxides at appropriate levels may also be used. Binder removal was completed by prefiring in air at 500° C.-900° C. for 1-10 hours. Prefired AlN parts were placed in BN or AlN crucibles which were semi-enclosed with a cover. Sintering was conducted in a horizontal carbon-element furnace containing fibrous carbon insulation and under one atmosphere of flowing high-purity-grade $N_2$ gas to which was added a pre-determined amount of $CH_4$ gas. The gas flow rate in the furnace corresponded to a linear gas speed of about 0.02 m/s. The sintering temperatures (about 1800° C. to about 1925° C.) were reached by heating at a rate of from about 2.5° C./min to about 30° C./min. The dwell time at the sintering temperature ranged from about 30 minutes to about 40 hours.

The total transmittance measurement was measured by placing a fiber-optical source inside the sintered AlN tube and measuring the total amount of diffuse light transmitted and integrated over a sphere. Typically, the onset of translucency pertains to the tubes showing a high total transmittance of greater than about 90%. A more detailed description of the measurement of total transmittance is given in U.S. Patent Publication No. 2005/0258759, which is incorporated herein by reference.

Sintering experiments using the $N_2$—$CH_4$ atmosphere produced as-sintered AlN arc tubes having a high total transmittance of greater than about 90%. A preferred level of $CH_4$ in $N_2$ is about 0.05 to about 0.1%. As shown in Tables 2-4, the total transmittance ranged from about 40-92% within the range of 1%-0.005% $CH_4$ content in $N_2$. An important finding was the need to use $CH_4$ during the temperature ramp up to the sintering temperature. A preferred ramp rate is less than about 10° C./min. Runs involving a high ramp rate (~30° C./min) resulted in low transmittance (57-79%). In addition, the data identified the critical role, in terms of achieving high transmittance, of changing to a relatively pure nitrogen atmosphere for the latter portion of the dwell at the sintering temperature. If the methane is used throughout the sintering cycle, the sintered AlN tubes are brownish and dark in color, in contrast with the colorless nature of high-transmittance AlN tubes. A total dwell of about 10 to about 25 hours is preferred. It is preferred to stop using $CH_4$ in the nitrogen gas sintering atmosphere at about 1 hour to about 15 hours after the start of a 20 hour dwell.

TABLE 2

| Gas | Dwell Temp. (° C.) | Dwell Time (h) | Ramp to Sintering Temp. | Cooldown Time | $N_2$—$CH_4$ portion of the cycle | Total transmittance (%) |
|---|---|---|---|---|---|---|
| $N_2$—1% $CH_4$ | 1925 | 4 | 1 h to 900° C. for 10 min, then 30 min to 1925° C. | 1 | $N_2$—$CH_4$ for all cycle | 58.6 |
| $N_2$—0.5% $CH_4$ | 1925 | 20 | 10 h 30 min | 5 h 15 min | $N_2$ only during ramp, switch to $N_2$—0.2% $CH_4$ during dwell | 61.6 |
| $N_2$—0.2% $CH_4$ | 1925 | 20 | 10 h 30 min | 5 h 15 min | $N_2$—$CH_4$ during ramp-up and 1st 10 h of dwell, $N_2$ only during second 10 h of dwell and cooldown | 70.4 |
| $N_2$—0.1% $CH_4$ | 1925 | 20 | 10 h 30 min | 5 h 15 min | $N_2$—$CH_4$ during ramp-up and 1st 10 h of dwell, $N_2$ only during second 10 h of dwell and cooldown | 92.1 |
| $N_2$—0.5% $CH_4$ | 1925 | 20 | 1 h to 900° C. for 10 min, then 6 h 42 min to 1925° C. | 2 h | $N_2$—$CH_4$ during ramp-up and 1st 15 h of dwell, $N_2$ only during second 5 h of dwell and cooldown | 90.7 |
| $N_2$—0.05% $CH_4$ | 1925 | 20 | 2 h | 1 h | $N_2$—$CH_4$ during ramp-up and 1st 12 h of dwell, $N_2$ only during second 8 h of dwell and cooldown | 71.9 |
| $N_2$—0.005% $CH_4$ | 1925 | 20 | 2 h | 1 h | $N_2$—$CH_4$ during ramp-up and 1st 5 h of dwell, $N_2$ only during second 15 h of dwell and cooldown | 67.6 |

TABLE 3

| Gas | Dwell Temp. (° C.) | Dwell Time (h) | Ramp to Sintering Temp. | Cooldown Time | $N_2$—$CH_4$ portion of the cycle | Total transmittance (%) |
|---|---|---|---|---|---|---|
| $N_2$—0.005% $CH_4$ | 1925 | 20 | 4 h | 1 h | $N_2$—$CH_4$ during ramp-up and 1st 10 h of dwell, $N_2$ only during second 10 h of dwell and cooldown | 79.4 |
| $N_2$—0.005% $CH_4$ | 1925 | 20 | 6 h | 1 h | $N_2$—$CH_4$ during ramp-up and 1st 10 hrs of dwell, $N_2$ only during second 10 hrs of dwell and cooldown | 76.3 |
| $N_2$—0.05% $CH_4$ | 1925 | 20 | 1 h to 900° C. for 10 min, then 6 h 42 min to 1925° C. | 2 h | $N_2$—$CH_4$ during ramp-up and 1st 10 h of dwell, $N_2$ only during second 10 h of dwell and cooldown | 89.3 |
| $N_2$—0.005% $CH_4$ | 1925 | 11 | 1 h to 900° C. for 10 min, then 6 h 42 min to 1925° C. | 2 h | $N_2$—$CH_4$ during ramp-up and 1st 10 h of dwell, $N_2$ only during second 1 h of dwell and cooldown | 69.6 |

TABLE 3-continued

| Gas | Dwell Temp. (°C.) | Dwell Time (h) | Ramp to Sintering Temp. | Cooldown Time | N$_2$—CH$_4$ portion of the cycle | Total transmittance (%) |
|---|---|---|---|---|---|---|
| N$_2$—0.005% CH$_4$ | 1925 | 20 | 3 h to 900° C. for 10 min, then 6 h 42 min to 1925° C. | 3 h | N$_2$—CH$_4$ during ramp only, and N$_2$ only during 20 h of dwell and cooldown | 88.5 |
| N$_2$—0.6% CH$_4$ | 1925 | 20 | 3 h to 900° C. for 10 min, then 6 h 42 min to 1925° C. | 3 h | N$_2$—CH$_4$ during ramp-up and 1st 10 h of dwell, N$_2$ only during second 10 h of dwell and cooldown | 91.1 |

TABLE 4

| Gas | Dwell Temp. (°C.) | Dwell Time (h) | Ramp to Sintering Temp. | Cooldown Time | N$_2$—CH$_4$ portion of the cycle | Total transmittance (%) |
|---|---|---|---|---|---|---|
| N$_2$—0.1% CH$_4$ | 1925 | 20 | 1 h to 900° C. for 10 min, then 6 h 42 min to 1925° C. | 2 h | N$_2$—CH$_4$ during ramp only, and N$_2$ only during 20 h dwell and cooldown | 69.7 |
| N$_2$—0.1% CH$_4$ | 1925 | 18 | 1 h to 900° C. for 10 min, then 6 h 42 min to 1925° C. | 2 h | N$_2$—CH$_4$ during ramp-up and 1st 9 h of dwell, N$_2$ only during second 9 h of dwell and cooldown | 83.0 |
| N$_2$—0.5% CH$_4$ | 1925 | 20 | 1 h to 900° C. for 10 min, then 6 h 42 min to 1925° C. | 2 h | N$_2$—CH$_4$ during ramp and 1st 10 h of dwell, N$_2$ only during second 10 h of dwell and cooldown | 86.0 |
| N$_2$—0.7% CH$_4$ | 1925 | 20 | 1 h to 900° C. for 10 min, then 6 h 42 min to 1925° C. | 4 h | N$_2$—CH$_4$ during ramp and 1st 10 h of dwell, N$_2$ only during second 10 h of dwell and cooldown | 88.2 |
| N$_2$—0.7% CH$_4$ | 1925 | 20 | 1 h to 900° C. for 10 min, then 6 h 42 min to 1925° C. | 4 h | N$_2$—CH$_4$ during ramp and 1st 10 h of dwell, N$_2$ only during second 10 h of dwell and cooldown | 88.5 |
| N$_2$—0.7% CH$_4$ | 1925 | 20 | 1 h to 900° C. for 10 min, then 6 h 42 min to 1925° C. | 2 h | N$_2$—CH$_4$ during ramp and 1st 10 h of dwell, N$_2$ only during second 10 h of dwell and cooldown | 87.5 |
| N$_2$—0.7% CH$_4$ | 1900 | 30 | 1 h to 900° C. for 10 min, then 8 h 30 min to 1900° C. | 2 h | N$_2$—CH$_4$ during ramp and 1st 15 h of dwell, N$_2$ only during second 15 h of dwell and cooldown | 74.5 |

The role of methane gas in the nitrogen sintering atmosphere is thought to involve production of the gaseous carbon species, which then act to remove the second phases derived from the sintering aids after the sintering aids complete their roles and the body reaches a closed-porosity stage. The absence of the gaseous CH$_4$ additive in N$_2$ atmosphere during the second half of the dwell prevents excessive reduction of AlN (i.e. formation of nitrogen vacancies) and minimizes any incorporation of carbon impurity into the sintered AlN.

The high-transmittance AlN tubes sintered in N$_2$—CH$_4$ atmosphere have the same colorless appearance as those sintered with solid piece of carbon as a charge material. The use of the N$_2$—CH$_4$ atmosphere is judged to be advantageous over the use of a solid piece of carbon charge material due to the uniform distribution of the gas and the ability to better control the partial pressure of carbon during the sintering cycle.

While there have been shown and described what are at present considered to be the preferred embodiments of the invention, it will be apparent to those skilled in the art that various changes and modifications can be made herein without departing from the scope of the invention as defined by the appended claims.

We claim:

1. A method of sintering an aluminum nitride article, comprising the steps of:

(a) placing the aluminum nitride article in a sintering atmosphere, the sintering atmosphere comprising nitrogen gas containing from about 0.05% to about 1% methane by volume;

(b) subjecting the aluminum nitride article to an increasing temperature;

(c) holding the aluminum nitride article at a sintering temperature for a first dwell period;

(d) changing the sintering atmosphere to nitrogen gas that does not contain methane;

(e) continue holding the aluminum nitride article at the sintering temperature for a second dwell period to form a sintered aluminum nitride article, wherein the second dwell period is from about 25% to about 95% of the sum of the first and second dwell periods; and (f) cooling the sintered aluminum nitride article.

2. The method of claim 1 wherein the sintered AlN article has a high total transmittance.

3. The method of claim 1 wherein the second dwell period is from about 25% to about 50% of the sum of the first and second dwell periods.

4. The method of claim 1 wherein the increasing temperature increases at a rate of less than about 10° C./minute.

5. The method of claim 4 wherein the increasing temperature increases at a rate of from about 2° C./minute to about 5° C./minute.

6. The method of claim 1 wherein the sintering temperature is from about 1800° C. to about 1950° C.

7. The method of claim 1 wherein the sintering temperature is from about 1900° C. to about 1925° C.

8. The method of claim 1 wherein the sum of the first and second dwell periods is from about 30 minutes to about 40 hours.

9. The method of claim 1 wherein the sum of the first and second dwell periods is from about 10 hours to about 25 hours.

10. A method of sintering an aluminum nitride article, comprising the steps of:
 (a) placing the aluminum nitride article in a sintering atmosphere, the sintering atmosphere comprising nitrogen gas containing from about 0.05% to about 1% methane by volume;
 (b) subjecting the aluminum nitride article to an increasing temperature that increases at a rate of less than about 10° C./minute;
 (c) holding the aluminum nitride article at a sintering temperature for a first dwell period;
 (d) changing the sintering atmosphere to nitrogen gas that does not contain methane;
 (e) continue holding the aluminum nitride article at the sintering temperature for a second dwell period to form a sintered aluminum nitride article, wherein the sintering temperature is from about 1800° C. to about 1950° C. and the second dwell period is from about 25% to about 95% of the sum of the first and second dwell periods; and
 (f) cooling the sintered aluminum nitride article.

11. The method of claim 10 wherein the second dwell period is from about 25% to about 50% of the sum of the first and second dwell periods.

12. The method of claim 10 wherein the sum of the first and second dwell periods is from about 30 minutes to about 40 hours.

13. The method of claim 12 wherein the increasing temperature increases at a rate of from about 2° C./minute to about 5° C./minute.

14. The method of claim 13 wherein the second dwell period is from about 25% to about 50% of the sum of the first and second dwell periods.

15. The method of claim 14 wherein the sintering temperature is from about 1900° C. to about 1925° C.

16. The method of claim 15 wherein the sum of the first and second dwell periods is from about 10 hours to about 25 hours.

* * * * *